(12) United States Patent
Levy et al.

(10) Patent No.: US 12,001,587 B2
(45) Date of Patent: Jun. 4, 2024

(54) DATA COMPLIANCE MANAGEMENT IN RECORDING CALLS

(71) Applicant: ZoomInfo Converse LLC, Vancouver, WA (US)

(72) Inventors: Russell Levy, Raanana (IL); Dominik Facher, San Francisco, CA (US); Micha Yochanan Breakstone, Raanana (IL)

(73) Assignee: ZOOMINFO CONVERSE LLC, Vancouver, WA (US)

( * ) Notice: Subject to any disclaimer, the term of this patent is extended or adjusted under 35 U.S.C. 154(b) by 0 days.

(21) Appl. No.: 18/341,658

(22) Filed: Jun. 26, 2023

(65) Prior Publication Data

US 2023/0334173 A1 Oct. 19, 2023

Related U.S. Application Data

(63) Continuation of application No. 17/372,181, filed on Jul. 9, 2021, now Pat. No. 11,720,707, which is a
(Continued)

(51) Int. Cl.
| | |
|---|---|
| *H04L 12/18* | (2006.01) |
| *G06F 21/62* | (2013.01) |
| *H04W 12/63* | (2021.01) |
| *G06N 20/00* | (2019.01) |
| *G10L 15/18* | (2013.01) |

(Continued)

(52) U.S. Cl.
CPC ...... *G06F 21/6245* (2013.01); *H04L 12/1831* (2013.01); *H04W 12/63* (2021.01); *G06N 20/00* (2019.01); *G10L 15/18* (2013.01); *G10L 15/22* (2013.01); *H04W 12/64* (2021.01)

(58) Field of Classification Search
CPC . G06F 21/6245; H04L 12/1831; H04L 12/63; H04L 12/64; H04L 12/1818; H04L 63/20; H04L 67/14; G06N 20/00; G10L 15/18; G10L 15/22; G10L 15/26
See application file for complete search history.

(56) References Cited

U.S. PATENT DOCUMENTS

| | | | |
|---|---|---|---|
| 7,023,979 B1 | 4/2006 | Wu et al. | |
| 7,487,094 B1 | 2/2009 | Konig et al. | |
| (Continued) | | | |

FOREIGN PATENT DOCUMENTS

| | | |
|---|---|---|
| CN | 102413309 | 4/2012 |
| CN | 104463478 | 3/2015 |
| (Continued) | | |

*Primary Examiner* — Lynn D Feild
*Assistant Examiner* — Abdullah Almamun
(74) *Attorney, Agent, or Firm* — Summit Patents PC (57) ABSTRACT

A conference management system facilitates data compliance in recording conversations between users. A host user can send an electronic invitation for a meeting to participants. Upon accessing the invitation, the participants can be presented with two options to join the conference—a first option using which a participant can join the meeting by providing consent to recording the meeting and a second option using which the participant can join the meeting by opting-out of recording of the meeting. When a participant opts-out of the recording of the meeting, the conference management system ensures that the recording is performed in compliance with a data compliance policy applicable to the participant who opted out of recording.

21 Claims, 7 Drawing Sheets

Related U.S. Application Data continuation of application No. 16/102,856, filed on Aug. 14, 2018, now Pat. No. 11,087,019.

(51) Int. Cl.
  *G10L 15/22* (2006.01)
  *H04W 12/64* (2021.01)

(56) References Cited

U.S. PATENT DOCUMENTS

| | | |
|---|---|---|
| 8,243,119 B2 | 8/2012 | Thapa |
| 8,576,750 B1 | 11/2013 | Hecht et al. |
| 8,606,746 B2 | 12/2013 | Yeap et al. |
| 8,781,841 B1 | 7/2014 | Wang |
| 8,817,966 B2 | 8/2014 | Wrench |
| 8,914,285 B2 | 12/2014 | Wasserblat et al. |
| 9,635,178 B2 | 4/2017 | Raanani et al. |
| 9,704,139 B2 | 7/2017 | Kanuturi et al. |
| 10,489,462 B1 | 11/2019 | Rogynskyy et al. |
| 10,498,767 B1 | 12/2019 | Khetawat et al. |
| 11,087,019 B2 | 8/2021 | Levy et al. |
| 2004/0098274 A1 | 5/2004 | Dezonno |
| 2007/0038499 A1 | 2/2007 | Margulies et al. |
| 2007/0153091 A1 | 7/2007 | Watlington et al. |
| 2009/0222313 A1 | 9/2009 | Kannan et al. |
| 2010/0017818 A1 | 1/2010 | Joshi et al. |
| 2012/0002002 A1 | 1/2012 | Shaffer et al. |
| 2012/0072254 A1 | 3/2012 | Mclean et al. |
| 2012/0135775 A1 | 5/2012 | Drozt et al. |
| 2013/0085785 A1 | 4/2013 | Rogers et al. |
| 2013/0145284 A1 | 6/2013 | Anantharaman et al. |
| 2013/0182061 A1 | 7/2013 | Stedman et al. |
| 2014/0025376 A1 | 1/2014 | Wasserblat et al. |
| 2014/0086402 A1 | 3/2014 | Kan et al. |
| 2014/0270133 A1 | 9/2014 | Conway et al. |
| 2014/0280186 A1 | 9/2014 | Peters et al. |
| 2014/0317030 A1 | 10/2014 | Shen et al. |
| 2014/0344355 A1 | 11/2014 | Gaucas |
| 2015/0058749 A1 | 2/2015 | Hwu |
| 2015/0081476 A1 | 3/2015 | Rego |
| 2015/0081806 A1 | 3/2015 | Kanuturi et al. |
| 2015/0103991 A1 | 4/2015 | Albert et al. |
| 2015/0201077 A1 | 7/2015 | Konig et al. |
| 2015/0237213 A1 | 8/2015 | Chishtl et al. |
| 2015/0242860 A1 | 8/2015 | Kannan et al. |
| 2015/0254675 A1 | 9/2015 | Kannan et al. |
| 2015/0256675 A1 | 9/2015 | Sri et al. |
| 2015/0262248 A1 | 9/2015 | Chaouki et al. |
| 2015/0348570 A1 | 12/2015 | Feast et al. |
| 2016/0004905 A1 | 1/2016 | Lucey et al. |
| 2016/0285929 A1 | 6/2016 | Oganezov et al. |
| 2016/0225372 A1 | 8/2016 | Cheung et al. |
| 2016/0352902 A1 | 12/2016 | Levy et al. |
| 2016/0352907 A1 | 12/2016 | Rannani et al. |
| 2017/0024699 A1 | 1/2017 | Millership et al. |
| 2017/0187880 A1 | 6/2017 | Rannani et al. |
| 2017/0337692 A1 | 11/2017 | Romanenko et al. |
| 2018/0032680 A1 | 2/2018 | Chen |
| 2018/0261307 A1 | 9/2018 | Couse et al. |
| 2019/0042645 A1 | 2/2019 | Othmer et al. |
| 2022/0345543 A1 | 10/2022 | Oleinikov et al. |

FOREIGN PATENT DOCUMENTS

| | | |
|---|---|---|
| CN | 105917363 | 8/2016 |
| JP | 2018022468 | 2/2018 |

DATA COMPLIANCE MANAGEMENT IN RECORDING CALLS

CROSS-REFERENCE TO RELATED APPLICATIONS

The present application is a continuation of and claims priority to U.S. patent application Ser. No. 17/372,181, filed Jul. 9, 2021, which is a continuation of U.S. patent application Ser. No. 16/102,856 filed on Aug. 14, 2018, now U.S. Pat. No. 11,087,019, the contents of which are hereby incorporated by reference in their entirety.

BACKGROUND

Current technologies facilitate recording of a call between users. The call can be in one of multiple modes, e.g., telephone call, video call, or online collaboration service-based call. The current technologies facilitate recording and sharing of the call between users. There are various laws, regulations and/or policies ("data compliance policies") governing processing of personally identifiable information or other related information of a user. These data compliance policies can require a user recording a call to obtain explicit consent from each of the users in the call to record the call. If one or more of the users do not give consent for recording of the call, the call may not be recorded.

The data compliance policies applicable to the recording can depend on various factors, e.g., organizational policies, regional policies, state or federal policies, and industry related policies, which can be different for different users in the call. If the user recording the call is not aware of the various data compliance policies applicable to the call, the user may be violating the data compliance policies. Current technologies do not determine or are ineffective in determining the data compliance policies applicable to a particular call, and therefore, they might end up recording the call, which may not be compliant with the applicable data compliance policies, or not recording the call at all, which may not be useful.

DETAILED DESCRIPTION

Embodiments are directed to a conference management system for ensuring data compliance in recording conversations between users. A host user can send an electronic invitation for a meeting or conference to participants. Upon accessing the invitation, the participants can be presented with two options to join the conference—a first option using, which allows a participant to join the meeting by providing consent to recording the meeting and a second option, which allows the participant to join the meeting by opting-out of recording of the meeting. When a participant opts out of the recording of the meeting, the conference management system ensures that either the meeting is not recorded, or the recording is performed in compliance with a data compliance policy applicable to the participant who opted out of recording.

In order to ensure that the recording is in compliance with the data compliance policy, the conference management system edits the recording in one or more ways. For example, the recording may be edited to block out a voice of the participant who opted out. In another example, the recording may be edited to distort a voice of a participant who opted out in such a way that one can still understand what the participating is saying, but not identify the voice of the participant. In another example, the recording may be edited to delete a portion of the speech corresponding to the participant who opted out. In still another example, the recording may be edited to obscure a face of the participant who opted out. In yet another example, the recording may be edited to obscure a face but retain a voice of the participant who opted out. In yet another example, the recording may be edited to retain a face but block out the voice of the participant who opted out. In still another example, the recording may be edited to remove any personal information or other information that is not compliant with the data compliance policy from the speech of the participant who opted out. In yet another example, the recording may be edited to remove a portion of the recording having the speech of the participant who opted out and generate a summary, e.g., textual summary, of the speech of the participant. That is, the conference management system generates a policy compliant recording of the meeting.

The conference management system determines one or more data compliance policies applicable to recording a conference based on metadata indicators associated with the users participating in the conference. A metadata indicator associated with a user includes one or more of a geographical location of the user, an Internet Protocol ('P) address of the user, a connection protocol using which the user connects to the conference, an industry, and/or an organization to which the user belongs. For example, if one of the users participating in the conference is located in Europe, the data compliance management system can determine that a data compliance policy such as General Data Protection Regulation (GDPR) is applicable to the recording of the conference. The conference management system ensures that any recording of the conference is compliant with GDPR. In some embodiments, more than one data compliance policy is applicable to the recording, e.g., data compliance policies defined by an organization of the users.

Note that a "conference" or "meeting" between users can be telephone based, Voice over Internet Protocol (VoIP) based, video conference based, Virtual Reality (VR) based, Augmented Reality (AR) based, or based on any online meetings, collaborations, or interactions. The conference can also be between participants physically located in the same room. Further, the editing of the recording of the conference can be performed in real-time, e.g., as the conference is taking place between the participants, or post the conference.

Figure 1:
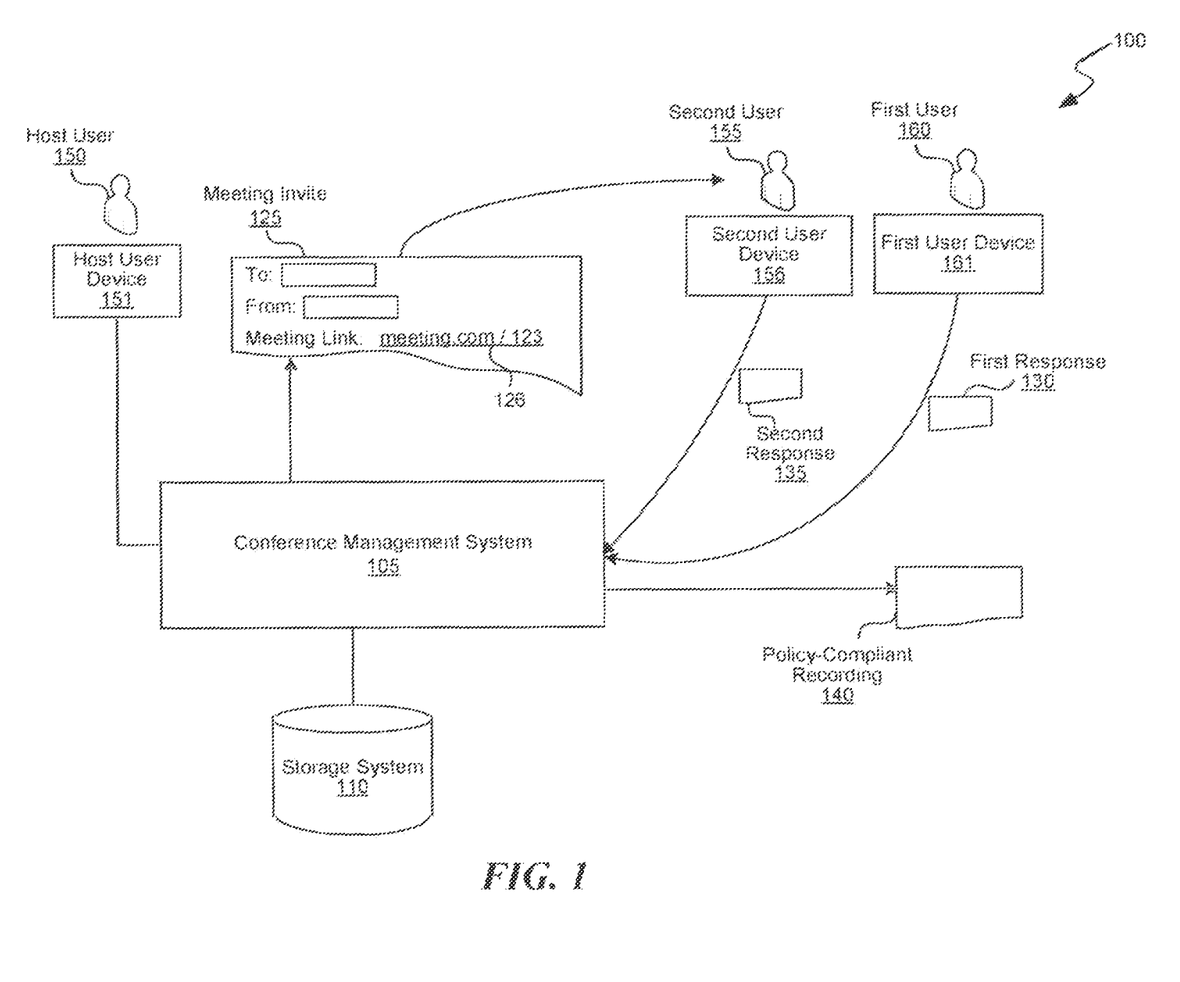
FIG. 1 is a block diagram of an environment in which the disclosed embodiments can be implemented.

Turning now to FIG. 1, FIG. 1 is a block diagram of an environment 100 in which the disclosed embodiments can be implemented. The environment 100 includes a conference management system 105 that facilitates generating of a policy compliant recording 140 of a meeting between multiple users, e.g., a host user 150 who organized the meeting and one or more participants, such as a first user 160 and a second user 155, who are invited for the meeting.

The conference management system 105 provides various features such as generating a meeting invite 125 for inviting participants to a meeting, allowing users to receive the meeting invite and join the meeting using the meeting invite, determining data compliance policies applicable to record the meeting, and generating a recording of the meeting in compliance with the data compliance policies. The host user 150 can access the conference management system 105 using a host user device 151. Similarly, the first user 160 and the second user 155 can access the conference management system 105 using a first user device 161 and a second user device 156, respectively. In some embodiments, a user device, such as the host user device 151, first user device 161 and second user device 156, can be any computing device, such as a smartphone, a tablet personal computer (PC), a desktop PC, a laptop, a wearable device, that is capable of accessing the conference management system 105. The conference management system 105 is accessible over a communication network, such as Internet, local area network (LAN), or wide area network (WAN).

The conference management system 105 provides a meeting invite generation feature using which the host user 150 can generate the meeting invite 125. The meeting invite 125 includes a meeting link 126 using which the participants can join the meeting. In some embodiments, the meeting link 126 is a personalized link which is specific to the host user 150. That is, any meeting organized by the host user 150 can have the same meeting link 126. However, the meeting link 126 may not be personalized to a user and can be generated in other ways, e.g., randomly. The host user 150 can add participants who the host user 150 wants to invite for the meeting to the meeting invite 125 and then send the meeting invite 125 to the invited participants, such as the first user 160 and the second user 155.

The conference management system 105 determines one or more data compliance policies applicable to recording the meeting based on the users participating in the meeting. In some embodiments, the conference management system 105 considers a metadata indicator associated with a user for determining a data compliance policy applicable to the recording. A metadata indicator associated with a user can include one or more of a geographical location of the user, an IP address of the user, a connection protocol using which the user connects to the meeting, an industry, and/or an organization to which the user belongs. For example, if the first user 160 is located in Europe, the conference management system 105 can determine that a data compliance policy such as GDPR is applicable to the recording of the meeting. Examples of data compliance policies include policies, laws, or regulations of various countries, such as Personal Information Protection and Electronic Documents Act (PIPEDA) of Canada, California Law, Illinois law, 2-party US states laws, Switzerland, United Kingdom, and European Union (EU) laws. The conference management system 105 can determine the geographical location of the users in many ways, e.g., an IP address of the user device using which the user is accessing the conference management system 105, from a user profile of the user stored in a data storage system 1 10, from a user profile in a third-party network such as a social networking service, or by requesting the user to provide the geographical location.

Examples of data compliance policies include industry related laws such as Health Insurance Portability and Accountability Act (HIPAA), Finance industry related laws and regulations. Further, organizations of users can have their own data compliance policies. Also, data compliance policies can be based on connection protocol. For example, if a user is using a less secure connection such as "http" instead of a secure connection, such as "https," then a specified data compliance policy may be applicable to the recording.

In some embodiments, more than one data compliance policy is applicable to the recording. For example, e.g., if different users are from different countries/regions having different data compliance policies, then multiple data compliance policies can be applicable to the recording. In another example, if the organization of an EU user has a specified data compliance policy, then the specified data compliance policy is applicable in addition to the GDPR data compliance policy.

The conference management system 105 can store the various data compliance policies in a data storage system 1 10 and can update them whenever the policies change. Further, the data storage system 1 10 can also store a mapping of the policies applicable to a user, e.g., in the user profile. The conference management system 105 can update the mapping if any of the metadata indicators associated with the user changes.

The conference management system 105 can also determine data compliance policies applicable to any ad-hoc meetings, including in-person meetings. The participants of ad-hoc in-person meetings may access the conference management system 105 using one or more user devices to record the meeting and to also indicate whether they opt-in or opt-out of recording. The conference management system 105 can determine the applicable data compliance policies based on metadata indicators such as location information of the ad-hoc in-person meeting, who the participants are and/or any other factors useful in determining the applicable data compliance policies. The location information can indicate or be used to derive information such as a geographical location of the participant, an organization to which the participant belongs, a department in the organization to which the participant belongs, etc. The conference management system 105 can use any of a number of techniques in identifying the location of the meeting, e.g., based on an IP address of an access point to which a user device of a user is connected, a cellular tower to which the user device is connected, location data derived from a global positioning system (GPS) associated with the user device, and/or other geo-location identifying technologies. The participant information can indicate or be used to derive participant identifying information such as a name of the participant, contact details of the participant, an organization to which the participant belongs, a department in the organization to which the participant belongs, a potential location of the participant based on the organization, etc. The conference management system 105 can use any of a number of techniques in identifying a participant in the meeting, e.g., based on participant provided information, based on system accessible information such as registration information associated with the participant (user name, company name of the user, etc.), calendar information such as conference rooms being used by the participant for the meeting, and/or based on biometrics data, such as face recognition, iris recognition, fingerprint recognition, or voice recognition.

Further, the conference management system 105 can also update (e.g., add and/or remove one or more data compliance policies) the data compliance policies applicable to the meeting in real-time. For example, if the location of the participants in the meeting changes in real-time, such as when the participants exit a building while still being in the meeting or when the participants cross a state border in a car while still being in the meeting, the conference management system 105 determines that the location of the participants changed from a first location to a second location, determines whether the applicable data compliance policies are to be changed based on the second location (e.g., add and/or remove one or more data compliance policies based on the change in location) and applies any changes to the recording.

The conference management system 105 can determine the data compliance policies applicable to the recording at one or more times, e.g., when the host user 150 adds the participants to the meeting invite 125, when the meeting invite 125 is sent to the participants, when the participants accept or reject the meeting invite 125, or when the participants join the meeting.

The participants can join the meeting by clicking the meeting link 126 in the meeting invite 125. Note that the meeting link 126 is just one example of a way to join the meeting, the meeting invite could have a button which can be selected to join the meeting. Upon selecting the meeting link 126, the conference management system 105 generates a graphical user interface (GUI) that has additional information regarding the meeting, which is described in detail at least with reference to FIG. 2. For example, the GUI can have a first link upon the selection of which a participant joins the meeting by providing consent to recording the meeting and a second link upon the selection of which the participant can join the meeting by opting out of recording of the meeting (that is, the user is not giving a consent to recording of the meeting). When the participants select one of the two links to join the meeting, a response notification indicating opt-in or opt-out of recording is sent to the conference management system 105 and to the host user 150. In some embodiments, a response notification is sent to the conference management system 105 only if the participant opts out of the meeting. For example, if the first user 160 opts out of the meeting, the first user device 161 sends a first response notification 130 indicating that the first user 160 opted out of recording the meeting. If the second user 155 opts in for recording, the second user device 156 sends a second response notification 135 indicating that the second user 155 opted in for recording the meeting.

When a participant opts-out of the recording of the meeting, the conference management system 105 ensures that either the meeting is not recorded, or the recording is performed in compliance with a data compliance policy applicable to the user who opted out of recording. The conference management system 105 determines the users who have opted out of the meeting, e.g., as described in detail at least with reference to FIG. 6, based on the response notifications and ensures that generated recording is in compliance with the data compliance policies applicable to the users who have opted out of recording. For example, if the conference management system 105 determines that the user who opted out is the first user 160 and that the data compliance policy applicable to the first user 160 is GDP R, the conference management system 105 edits the recording of the conference 140 to ensure that the recording is compliant with GDPR. In some embodiments, to ensure that the recording of the conference 140 is compliant with GDP R, the conference management system 105 edits the recording to remove personally identifiable information (P"), or sensitive personal information, which is information that can be used on its own or with other information to identify, contact, or locate the first user 160, or to identify the first user 160 in context. PI' can be any information associated with a user that one or more data compliance policies prohibit recording and/or storing without consent of the user. Examples of PI' can include personal data, biometric data, sensitive data, health data, and financial data.

The conference management system 105 can edit the recording in many ways to generate the policy compliant recording 140. For example, the recording may be edited to block out a voice of the first user 160. In another example, the recording may be edited to delete a portion of the speech corresponding to the first user 160. In still another example, the recording may be edited to obscure a face of the first user 160. In yet another example, the recording may be edited to obscure a face but retain a voice of the first user 160. In yet another example, the recording may be edited to retain a face but block out the voice of the first user 160. In yet another example, the recording may be edited to remove a portion of the recording having the speech of the first user 160 and a summary, e.g., textual summary, of the speech of the first user 160 may be generated.

In other words, the conference management system 105 edits the recording to remove any PI' or other information from the speech of the first user 160 that is not compliant with the data compliance policy. The type of editing performed to generate the policy compliant recording 140 can be dependent on the data compliance policies applicable to the recording and any other user preferences, e.g., preferences of the host user 150.

The conference management system 105 can determine the PI' or other information in the recording that is not compliant with the applicable data compliance policy using one or more techniques, e.g., automatic speech recognition, a rule-based technique, artificial intelligence (AI), machine learning (ML), natural language processing (NLP), or image recognition. The conference management system 105 can use any of the foregoing techniques to edit the recording to generate the policy compliant recording 140. For example, the conference management system 105 can generate the summary using any of AI, ML or NLP techniques. In another example, the conference management system 105 can identify a face of the participant in the meeting using image recognition techniques. The conference management system 105 can obtain at least of portion of identification information of a participant from one or more sources and use that to determine and remove the PI' of the participant from the recording. The one or more sources can include the participant provided information in the meeting, information stored at the data storage system 1 10, e.g., as part of user profile of a user, and/or third-party sources such as a social networking service.

The policy compliant recording 140 may be stored at the data storage system 1 10, and optionally, may be shared with the users. Further, in some embodiments, an unedited version of the recording may be stored at the data storage system 1 10 in addition to the policy compliant recording 140. For example, if the meeting is related to health information of users and one of the participants in the conference is HIPAA compliant and another participant is not HIPAA compliant, the conference management system 105 can share the unedited version of the recording, e.g., the recording having the entire speech of all the users in the meeting, with the HIPAA compliant participant, and the policy compliant recording 140 with the participant who is not HIPAA compliant.

Figure 2:
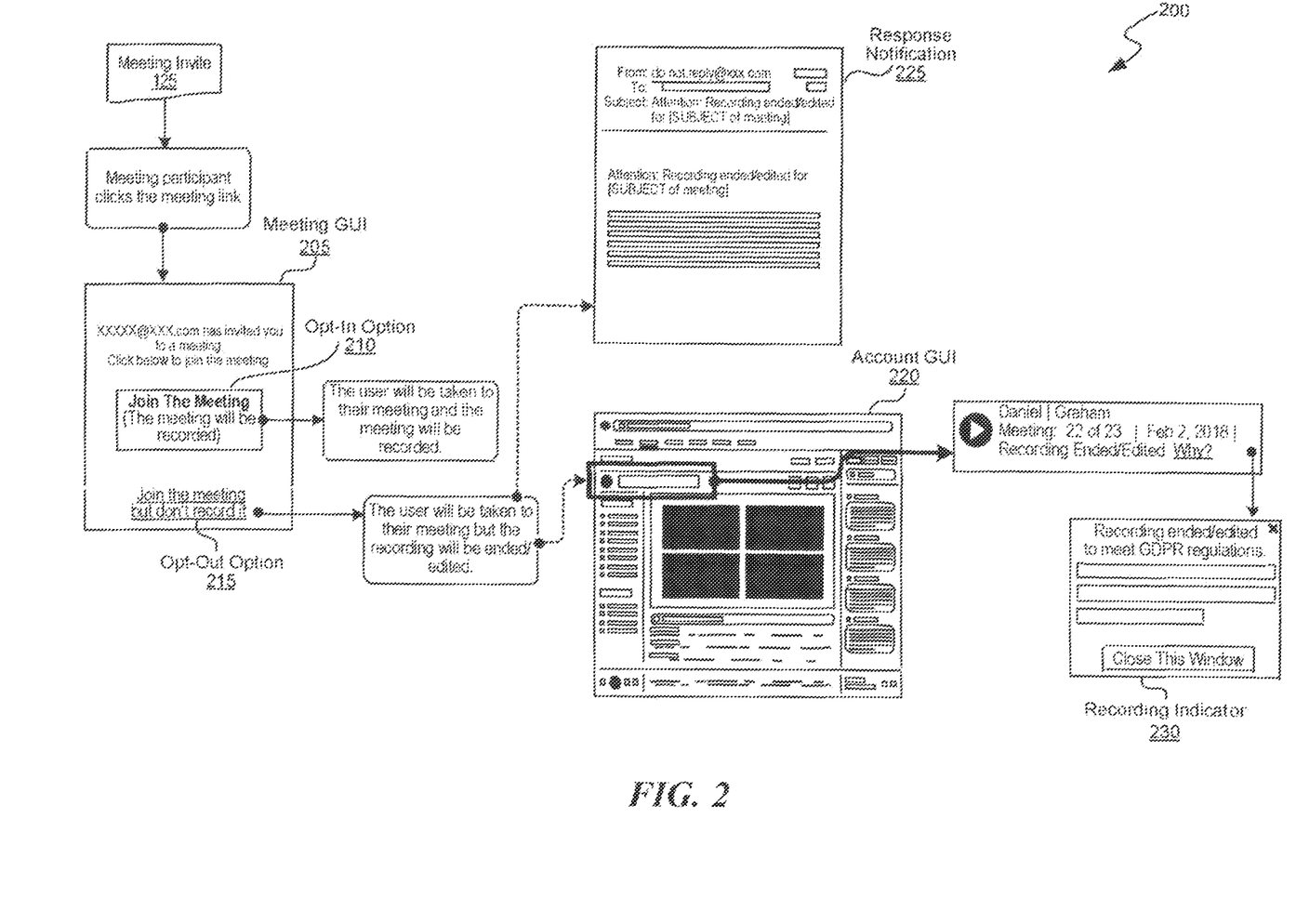
FIG. 2 is a block diagram of an example for generating a policy compliant recording, consistent with various embodiments.

FIG. 2 is a block diagram of an example 200 for generating a policy compliant recording, consistent with various embodiments. The host user 150 of FIG. 1 sends the meeting invite 125 to the meeting participants, e.g., the first user 160 and the second user 155. The first user 160 receives the meeting invite 125 and selects the meeting link 126 in the meeting invite 125. Upon selecting the meeting link 126, the conference management system 105 generates a meeting GUI 205. The meeting GUI 205 includes two options, an opt-in option 210 upon the selection of which the first user 160 can join the meeting by providing consent to recording of the meeting and an opt-out option 215 upon the selection of which the first user 160 can join the meeting but opt out of recording of the meeting. In some embodiments, the two options are generated as electronic links. However, the two options can be generated in various other forms, e.g., as buttons.

In some embodiments, the opt-out option 215 is shown if the first user 160 is subject to one or more data compliance policies. If the first user 160 is not subject to any data compliance policy, the conference management system 105 does not include the opt-out option 215 in the meeting GUI 205. That is, the conference management system 105 displays the opt-out option 215 to only those users for whom one or more data compliance policies are applicable. For example, the opt-out option 215 can be geo-fenced. That is, the opt-out option 215 can be shown to users of a specific geographical location in which one or more data compliance policies are applicable.

If the first user 160 selects the opt-in option 210, the first user 160 proceeds to join the meeting by providing a consent to record the meeting. On the other hand, if the first user 160 selects the opt-out option 215, the first user 160 proceeds to join the meeting without providing a consent to record the meeting. A response notification 225 indicating that the first user 160 opted out of recording the meeting is sent to the conference management system 105. In some embodiments, the response notification 225 is similar to the first response notification 130. The conference management system 105 generates a recording, e.g., policy compliant recording 140, that is compliant with the data compliance policy applicable to the first user 160. Further, the conference management system 105 provides an account GUI 220 using which the host user 150 can obtain various information about the meeting. For example, the account GUI 220 can obtain and display information such as the meetings organized by the host user 150, participants in each of the meetings, a recording of the meetings, whether one or more users opted out of a particular meeting etc. In some embodiments, the account GUI also shows a recording indicator 230, which includes information regarding a user who opted out of recording a meeting, the data compliance policy applicable to the user and a notification that the recording was stopped or edited to be compliant with the applicable data compliance policy.

Figure 3:
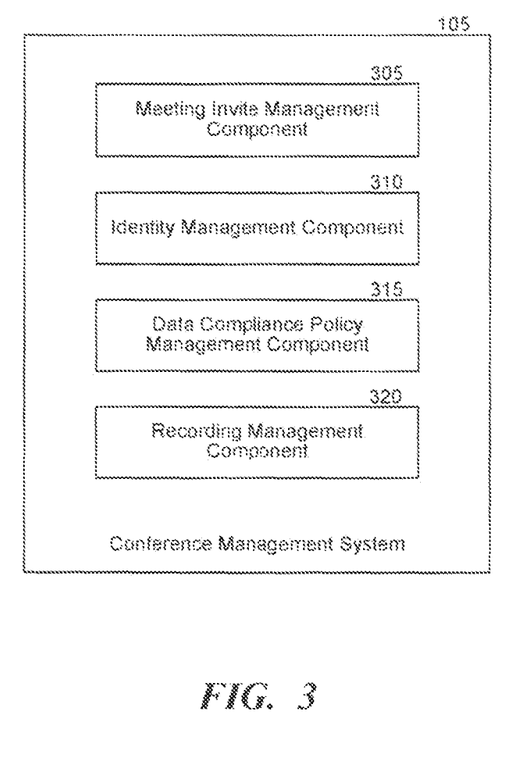
FIG. 3 is a block diagram of a conference management system of FIG. 1, consistent with various embodiments.

FIG. 3 is a block diagram of the conference management system 105 of FIG. 1, consistent with various embodiments. The conference management system 105 includes a meeting invite management component 305, an identity management component 310, a data compliance management component 315, and a recording management component 320. The meeting invite management component 305 facilitates generation of a meeting invite, e.g., meeting invite 125, for a host user 150 to invite participants to a meeting.

Figure 6:
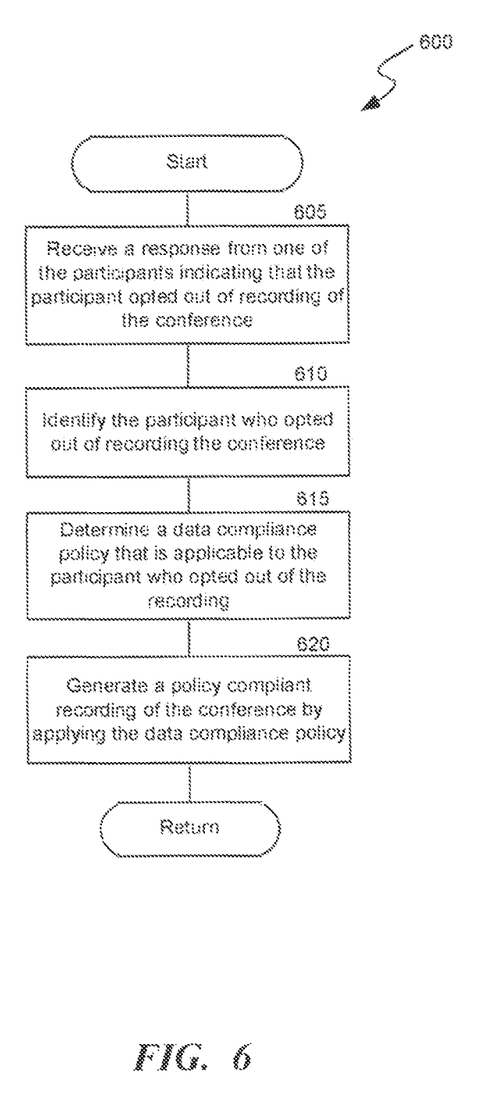
FIG. 6 is a flow diagram of a process for generating a policy compliant recording of a meeting, consistent with various embodiments.

The identity management component 310 identifies the participants who have opted out of recording a meeting, e.g., as described in detail at least with reference to FIG. 6.

The data compliance management component 315 determines a data compliance policy applicable to the recording of the meeting, e.g., based on metadata indicators associated with the users in the meeting as described at least with reference to FIG. 1.

The recording management component 320 generates a policy compliant recording, e.g., the policy compliant recording 140, based on the applicable data compliance policy determined by the data compliance management component 315 as described at least with reference to FIG. 1.

Additional details with respect to the foregoing components are described at least with reference to FIGS. 4-6 below.

Figure 4:
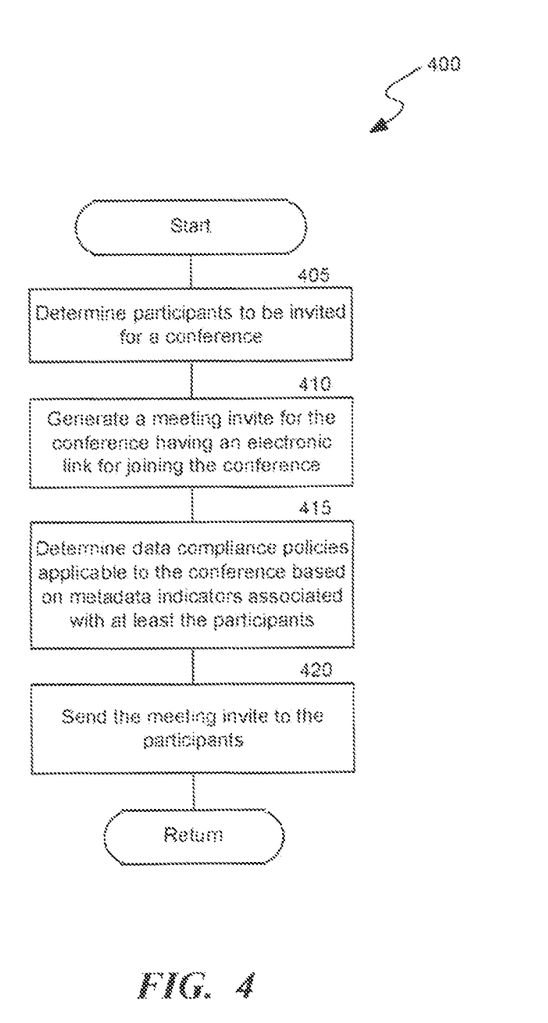
FIG. 4 is a flow diagram of a process for generating a meeting invite, consistent with various embodiments.

FIG. 4 is a flow diagram of a process 400 for generating a meeting invite, consistent with various embodiments. In some embodiments, the process 400 can be implemented using the conference management system 105 of FIG. 1. At block 405, the meeting invite management component 305 determines the participants to be included in a meeting invite based on the information provided by a host user hosting the meeting. For example, as described at least with reference to FIG. 1, the host user 150 can provide information such as users to be invited for the meeting.

At block 410, the meeting invite management component 305 generates a meeting invite having a meeting link 126 using which the participants can join the meeting. For example, as described at least with reference to FIG. 1, the meeting invite management component 305 can generate a meeting link 126 for the host user 150. The meeting link 126 can be personalized for the host user 150 or can be generated randomly.

At block 415, the data compliance management component 315 determines one or more data compliance policies applicable to the meeting. In some embodiments, the data compliance management component 315 determines one or more data compliance policies applicable to the meeting based on metadata indicators associated with the users in the meeting as described at least with reference to FIG. 1. For example, the data compliance management component 315 determines the data compliance policies applicable to the meeting hosted by the host user 150 based on the metadata indicators associated with the host user 150, the first user 160 and the second user 155.

At block 420, the data compliance management component 315 sends the meeting invite to the participants of the meeting. For example, the data compliance management component 315 sends the meeting invite to the first user 160 and the second user 155.

Note that the data compliance management component 315 can determine the data compliance policies at various times and is not restricted to determining them after generating the meeting invite in block 410. For example, the data compliance management component 315 can determine the data compliance policies applicable to the meeting when the host user 150 adds the participants to the meeting invite 125, when the meeting invite 125 is sent to a participant, when the participant accepts or rejects the meeting invite 125, when the participant selects the meeting link 126 from the meeting invite 125, or when the participant joins the meeting.

Figure 5:
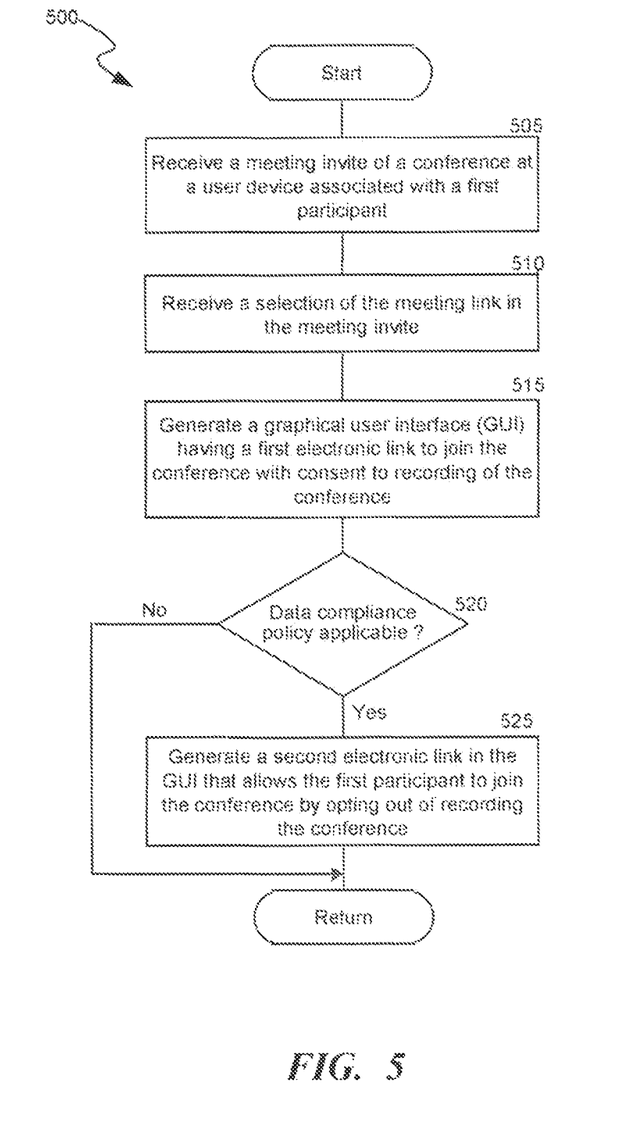
FIG. 5 is a flow diagram of a process for joining a meeting, consistent with various embodiments.

FIG. 5 is a flow diagram of a process 500 for joining a meeting, consistent with various embodiments. In some embodiments, the process 500 can be implemented using the conference management system 105 of FIG. 1. At block 505, a user device associated with a participant of a meeting receives a meeting invite from a host user. For example, the first user device 161 associated with the first user 160 receives the meeting invite 125 from the host user 150.

At block 510, the meeting invite management component 305 receives a selection of the meeting link in the meeting invite from the participant. For example, the meeting invite management component 305 receives a selection of the meeting link 126 from the first user 160.

At block 515, the meeting invite management component 305 generates a meeting GUI having a first electronic link using which the participant can join the meeting by providing consent to recording of the meeting. For example, the meeting invite management component 305 generates the meeting GUI 205 of FIG. 2 having an opt-in option 210 using which the first user 160 can join the meeting by providing consent to recording of the meeting.

At determination block 520, the data compliance management component 315 determines whether any data compliance policy is applicable to the participant. For example, the data compliance management component 315 can determines whether any data compliance policy is applicable to the first user 160 based on a geographical location of the first user 160, which can be determined using at least the IP address of the first user device 161.

At block 525, in an event the data compliance management component 315 determines that a data compliance policy is applicable to the participant, the meeting invite management component 305 generates a second electronic link in the meeting GUI, which allows the participant to join the conference by opting out of recording the meeting. In some embodiments, the second electronic link can be geofenced, that is, the second electronic link is displayed if the participant is located in a particular geographical location. For example, if the data compliance management component 315 determines that the first user 160 is in EU geographical location, the meeting invite management component 305 generates an opt-out option 215 in the meeting GUI 205.

On the other hand, if the data compliance management component 315 determines that no data compliance policy is applicable to the participant, the process 500 returns without displaying the second electronic link.

While the process 500 describes the meeting invite management component 305 as generating the opt-out option 215 in the meeting GUI 205 if the data compliance management component 315 determines that one or more data compliance policies are applicable to the participant, in some embodiments, the meeting invite management component 305 generates the opt-out option 215 in the meeting GUI 205 regardless of whether any data compliance policy is applicable to the participant.

FIG. 6 is a flow diagram of a process 600 for generating a policy compliant recording of a meeting, consistent with various embodiments. In some embodiments, the process 600 can be implemented using the conference management system 105 of FIG. 1. At block 605, the meeting invite management component 305 receives a response from a participant of a meeting indicating that the participant opted out of recording the meeting. That is, the response indicates that the participant did not give his/her consent for the meeting to be recorded. For example, the meeting invite management component 305 receives the first response notification 130 from the first user 160 indicating that the first user 160 opted out of recording the meeting.

At block 610, the identity management component 310 determines the participants who opted out of recording the meeting. The identity management component 310 can determine a participant who opted out of recording the meeting in various ways. In some embodiments, the identity management component 310 determines a participant who opted out of recording the meeting based on IP address of the participant, time at which the participant joined the meeting, time at which the participant selected the opt-out option, or one or more server computers through which the response indicating the opt-out option is transmitted and through which a connection to the meeting is established for the participant.

In some embodiments, the identity management component 310 can determine a specified response time, which is a time at which a response notification indicating an opt-out is received from one of the participants. The identity management component 310 monitors the joining of the participants to the meeting, and if it finds a specified participant who joined the meeting at a specified start time which is within a specified duration from the specified response time, the identity management component 310 can determine that the specified participant is the participant who opted out. For example, if the identity management component 310 receives a response notification indicating an opt-out at 10:55:52 AM from one of the users and a user joins the meeting at 10:55:54 AM introducing as the first user 160, the identity management component 310 determines that since the duration of 2 seconds between the start time of the first user 160 and the response time of an optout response notification is within a specified threshold, the first user 160 is the one who opted out. The identity of the specified participant can be obtained when the specified participant joins the meeting (e.g., based on identification information, such as a name, provided by the specified participant while joining the meeting). In some embodiments, a threshold for the specified duration can be set by an administrator of the conference management system 105.

In some embodiments, the identity management component 310 compares a first IP address from which a response notification indicating the opt-out of one of the participants is received with a second IP address of a specified participant who joined the meeting. If the first IP address and the second IP address are the same, the identity management component 310 determines that the specified participant is the participant who opted out of the recording.

In some embodiments, the identity management component 310 compares a first set of server computers through which a response notification indicating an opt-out of one of the participants is received with a second set of servers through which a connection to the meeting is established by a specified participant who joined the meeting. If the first set of servers and the second set or servers are the same, the identity management component 310 determines that the specified participant is the participant who opted out of the recording.

After determining the identity of the participant who opted out of the recording, at block 615, the data compliance management component 315 determines a data compliance policy that is applicable to the participant who opted out of the recording, e.g., as described at least with reference to FIGS. 1 and 4. For example, the data compliance management component 315 determines the data compliance policy applicable to the first user 160 is GDPR.

At block 620, the recording management component 320 generates a policy compliant recording of the meeting by applying the data compliance policy determined in block 615. For example, the recording management component 320 edits the recording of the meeting by removing any PI' from the recording to generate a policy compliant recording 140 that is compliant with GDPR. Additional details with respect to editing the recording to make the recording compliant with one or more applicable data compliance policies are described.

Figure 7:
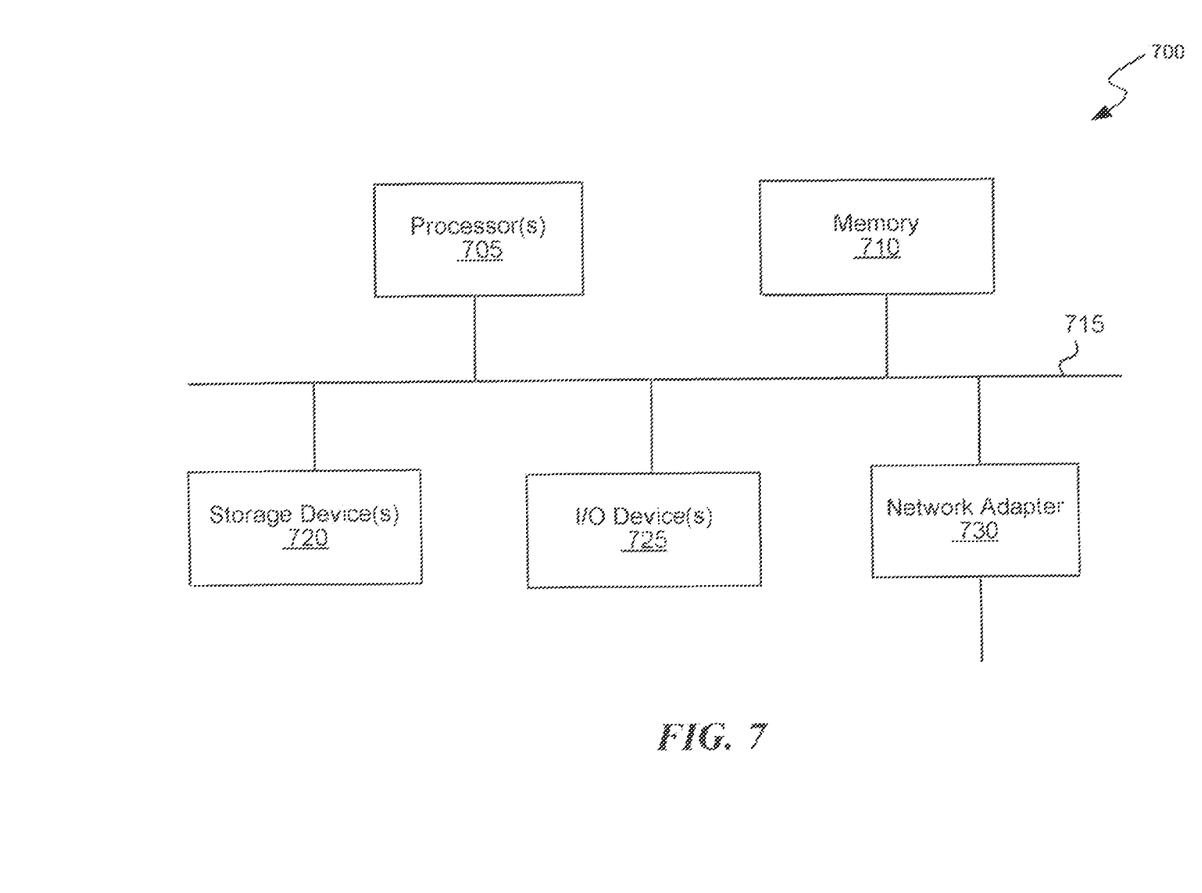
FIG. 7 is a block diagram of a processing system that can implement operations of the disclosed embodiments.

FIG. 7 is a block diagram of a computer system that may be used to implement features of the disclosed embodiments. The computing system 700 may be used to implement any of the entities, components or services depicted in the examples of the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Components (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special purpose hardwired (nonprogrammable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method, comprising:
  receiving an invite associated with a first participant profile of a first participant, the invite including a request to the first participant to join a conference attended by multiple participants;
  transmitting input from the first participant to accept the invite to join the conference;
  prompting the first participant to respond to an inquiry on whether a presence or an identity of the first participant is to be obfuscated in a recording of the conference based on (i) input from the first participant; or (ii) a metadata indicator that is associated with the first participant;

receiving a first participant response to the inquiry that includes a request to obfuscate the presence or the identity of the first participant in the recording of the conference; and based on the first participant response to the inquiry, transmitting an instruction to a remote server to initiate a data compliance policy to generate a policy-compliant recording of the recording of the conference to obfuscate the presence or the identity of the first participant during the conference.

2. The method of claim 1, wherein the instruction includes editing an attribute associated with the first participant in a portion of the recording of the conference in generating the policy-compliant recording.

3. The method of claim 2, wherein the instruction that includes editing includes:

instructing the remote server to identify the portion of the recording of the conference that includes speech of the first participant;

generating a summary of the speech of the first participant in the identified portion of the recording of the conference; and deleting the portion of the recording of the conference.

4. The method of claim 3, wherein the generated summary of the speech omits identification information of the first participant.

5. The method of claim 2, wherein the instruction that includes editing includes an instruction to obscure a face or other visual feature of the first participant in the portion of the recording of the conference to generate the policy-compliant recording.

6. The method of claim 2, wherein the instruction that includes editing includes an instruction to block a voice of the first participant in the portion of the recording of the conference to generate the policy-compliant recording.

7. The method of claim 2, wherein the instruction that includes editing includes an instruction to obscure a face or other visual feature and to block a voice of the first participant in the portion of the recording of the conference to generate the policy-compliant recording.

8. The method of claim 1, wherein the metadata indicator is representative of an Internet Protocol (IP) address, a geographical location, an industry mark, an organization mark, or a connection protocol used by the given participant.

9. The method of claim 1, further comprising receiving the invite at a first participant device associated with the first participant profile.

10. The method of claim 9, further comprising transmitting, from the first participant device, the input from the first participant to accept the invite to join the conference.

11. The method of claim 9, further comprising transmitting, from a second participant device associated with the first participant profile, the input from the first participant to accept the invite to join the conference.

12. The method of claim 9, further comprising receiving the first participant response to the inquiry from the first participant device.

13. The method of claim 12, further comprising transmitting, from the first participant device, the instruction to the remote server to initiate the data compliance policy to generate the policy-compliant recording.

14. The method of claim 1, wherein receiving the invite including the request to the first participant to join the conference is received simultaneously with receiving the first participant inquiry on whether the presence or the identity of the first participant is to be obfuscated in the recording of the conference.

15. The method of claim 1, further comprising receiving the first participant inquiry on whether the presence or the identity of the first participant is to be obfuscated in the recording of the conference in response to transmitting the input from the first participant to accept the invite to join the conference.

16. The method of claim 1, wherein the data compliance policy includes a first portion applicable to a first portion of the recording of the conference and a second portion applicable to a second portion of the recording of the conference.

17. The method of claim 1, wherein the data compliance policy corresponds to the first participant profile of the first participant.

18. The method of claim 1, the data compliance policy corresponds to the first participant profile of the first participant and an additional participant profile of one of the multiple participants.

19. The method of claim 1, wherein the invite includes data indicating that a second participant also received the invite.

20. The method of claim 19, further comprising transmitting data that includes a notice to the second participant that the first participant requested to obfuscate the presence or the identity of the first participant in the recording of the conference.

21. The method of claim 20, wherein the data that includes the notice to the second participant that the first participant requested to obfuscate the presence or the identity of the first participant in the recording of the conference is transmitted from a first participant device associated with the first participant or from the remote server.

* * * * *